United States Patent [19]

Panken

[11] 3,962,526

[45] June 8, 1976

[54] TISSUELESS PRE-PRINTED SPIRIT DUPLICATING MASTERS

[75] Inventor: Irving Panken, Dayton, Ohio

[73] Assignee: The Mazer Corporation, Dayton, Ohio

[22] Filed: July 23, 1974

[21] Appl. No.: 490,979

[52] U.S. Cl. .............................. 428/488; 106/21; 106/31; 427/144
[51] Int. Cl.² .................. B41M 5/04; B41M 5/18
[58] Field of Search ............. 117/35.6; 106/22, 31; 101/473, 469, 472; 428/474, 488; 427/144

[56] References Cited
UNITED STATES PATENTS

| | | | |
|---|---|---|---|
| 2,324,671 | 7/1943 | Bernstein | 106/30 |
| 2,732,795 | 1/1956 | Brandt et al. | 117/35.6 |
| 2,748,024 | 5/1956 | Klimkowski et al. | 117/36.2 |
| 2,824,812 | 2/1958 | Drautz | 106/14.5 |
| 3,036,924 | 5/1962 | Newman | 117/35.6 X |
| 3,446,646 | 5/1969 | Terry | 117/35.6 |
| 3,459,581 | 8/1969 | Newman | 117/36.4 X |
| 3,619,157 | 11/1971 | Brinckman | 117/35.6 X |
| 3,730,091 | 5/1973 | Gaynor | 101/473 |

*Primary Examiner*—Thomas J. Herbert, Jr.
*Attorney, Agent, or Firm*—Biebel, French & Nauman

[57] ABSTRACT

The spirit duplicating masters are pre-printed utilizing a non-bleed, non-smear ink composition. Typically the ink may contain cetyl alcohol, carnauba wax, a soft wax, fillers and a small amount of dye solubilizer and/or wetting agent. Such pre-printed masters may be formed into booklets without the necessity of interleaved protective layers or tissues.

11 Claims, No Drawings

TISSUELESS PRE-PRINTED SPIRIT DUPLICATING MASTERS

BACKGROUND OF THE INVENTION

This invention relates to masters for spirit duplication systems, and more particularly, to tissueless pre-printed spirit duplicating masters.

With the ever increasing work load on teachers and instructors, it becomes important to use modern technology to relieve the teachers of some of the duties ordinarily undertaken. One tool of frequent use by educators is spirit duplication for producing copies of tests and instructional materials. Conventionally, the instructor types a master from a transfer sheet having coated on the surface thereof a hectographic ink. U.S. Pat. Nos. 2,748,o24 to Klimkowski; 2,824,812 to Drautz, and 3,036,924 to Newman, disclose examples of ink compositions which are coated onto transfer sheets for use in a hectographic duplication process. As illustrated in Klimkowski, the image is formed in reverse on a master by transfer from the carbon-type transfer sheet. The ink used on such transfer sheets typically contains a wax, a mineral oil and/or fatty acid, a petrolatum, and a dye such as crystal violet.

It has been found that it is also possible to preprint masters with ink compositions of this type so that the teacher can use such pre-printed masters to make copies for students on a given subject without having to compose the assignment itself. However in pre-printed masters of this type the ink may tend to bleed through the paper to the front surface giving a "halo" effect to the image on the front surface. Under some circumstances the halo, if severe enough, renders the sheet aesthetically undesirable or even possibly unacceptable.

In addition, the known spirit duplicating inks tend to smear and transfer when rubbed and on the application of pressure. Generally a protective tissue layer is used to prevent unintentional transferring and smearing in this manner. If pre-printed masters are used, it is also necessary to use some form of protective device such as individual envelopes, a protective overcoat, or protective tissue sheets.

The necessity of protective tissue sheets is even more evident if a booklet of pre-printed masters is prepared since there is always the danger of transfer of spirit-duplicating ink from the back side of one master to the front of the underlying master. In addition, with today's ever increasing cost of paper the use of interspersed tissue layers in such booklets also represents a considerable cost factor.

Accordingly, the need exists for pre-printed spirit duplicating masters which do not require the use of a protective tissue. While the problem of smearing and bleeding has long been recognized (see, e.g., Drautz, col. 1, lines 14–20), a satisfactory solution has not been yet found. No known spirit-duplicating ink, particularly one capable of being pre-printed on masters, will overcome these problems. Likewise, even though non-bleeding materials, such as cetyl alcohol, are known and have been used in printing inks (see, e.g., Bernstein, U.S. Pat. No. 2,324,671), their only use has been only to reduce the rate of evaporation of the ink composition in a solvent printing process.

Thus, a pre-printed spirit duplicating master which will not bleed or smear and can be used in a booklet without the need for a protective tissue is needed in such areas as pre-prepared instructional material.

Summary of the Invention

In accordance with the present invention, there is provided a pre-printed spirit duplicating master which is non-bleeding, will not smear, and overcomes the problems of prior art systems requiring a protective tissue. The instant invention involves the use of an ink composition which may be easily pre-printed onto the masters and the masters collated into a booklet free of cumbersome and expensive protective layers. The masters in the booklet may be joined with other materials or inserts such as records, film strips, transparencies, etc., and is bound along at least one edge by any conventional technique. Perforations may be used to facilitate easy removal of the individual masters from the booklet.

Such a booklet may, for example, be arranged by topic. In this way, when the class reaches a point where a quiz, exam or particular work lesson is appropriate, the teacher need only extract the particular individual pre-printed spirit duplicating master from the booklet and prepare copies for the intended instructional use.

Of course, the non-bleeding pre-printed masters of the present invention need not be formed into a booklet, but may be used individually. In addition, they need not be used solely in the educational field, but can be prepared any time hectographic copies are desired on a predetermined subject matter.

While the pre-printed masters of the invention do not require a box, envelope or protective layer, as is true with the prior art masters, one may be desirable for packaging or storage purposes, and so may be used. When used, the box, envelope or protective layer provides an additional protective layer or covering.

The present invention is broadly a spirit duplicating ink which includes a material such as cetyl alcohol in place of the fatty acids and oils generally used to solubilize the dyes. Cetyl alcohol is solid (melting point =50°C) and non-bleeding at room temperature, but is soluble in spirit duplicating fluids for purposes of duplication. It also solubilizes the crystal violet dye used.

The improved spirit duplicating ink of the invention has a markedly reduced percentage of oils from prior art systems, and so is rendered non-bleeding and non-smearing. Even if small amounts of conventional dye solubilizers are used, these do not adversely affect the non-bleeding properties of the paper due to the larger-than-usual amounts of waxes present in the instant invention. Such waxes help contain the dye solubilizers. The only oil-type materials contemplated are a small amount of wetting agent, such as lecithin and small amounts of dye solubilizers. In addition to the cetyl alcohol, wetting agent or dye solubilizer and crystal violet dye, a carnauba wax, a soft wax such as spermacetti or candelilla, and filler materials are used in the ink formulation.

While use of the ink compositions of this type for the most part solve the problems of bleed and smear, it is often also desirable to treat at least the front surface of the master with an oleophobic material such as a silicone material. This is particularly desirable if the masters are to be formed booklets since it will help prevent transfer of the ink from the back side of one master to the adjacent front surface of the adjoining master. Additionally, an oleophobic paper prevents bleeding of the ink from the back side, through the paper, and on to the front of that master. Such oleophobic papers, which are still receptive to printing inks as well as the spirit duplicating ink of the present invention, are well known in the art.

According, it is an object of the present invention to provide a pre-printed spirit duplicating master which will not bleed or smear.

Another object of the present invention is to prepare non-bleed pre-printed masters formed into tissueless booklets for instructional use.

Still another object of this invention is to provide a hot-melt ink composition which may be used to pre-print non-bleed spirit duplicating masters.

Other objects and advantages of the invention will be apparent from the following description and the appended claims.

DESCRIPTION OF THE PREFERRED EMBODIMENTS

In a pre-printed master for use in educational testing, the front surface may be printed in typical fashion (for example, by offset printing) with the test questions as well as instructional material for the teacher's use. On the back side a reverse image of the material to be duplicated (i.e., the test questions) is printed in registry with that on the front surface.

In the preferred embodiment of the present invention, the images on the front surface are printed on a sheet which has been rendered oleophobic by a treatment process such as in the Scotch-Ban FC-807 papers available from the Howard Paper Company. The reverse image of the ink composition of the present invention is pre-printed on the back side. Offset rotogravure, letterpress, stencilling or aniline printing techniques may be used to do the pre-printing.

The preferred hot melt ink formulation is generally as follows:

| Ingredients | Weight Percentage |
|---|---|
| Wetting agent | 0–1 |
| Cetyl alcohol | 5–25 |
| Wax | 31–48 |
| Dye | 35–45 |
| Filler | 7–12 |
| Dye Solubilizer | 0–10 |

The wetting agent may be an emulsifier such as lecithin. The wax is a mixture of carnauba wax and a soft wax such as spermacetti or candelilla. The dye may be crystal violet of the type ordinarily used in spirit duplicating ink compositions; although, the higher-solubility grades are preferred. Included as possible fillers are attapulgite clay and fused silica such as Silanox, manufactured by the Cabot Corp. The dye solubilizer may be conventional fatty oils or other known solubilizers.

Paper sheets treated on the front surface to render them oleophobic and then offset printed on the front surface, were hot-melt printed on the back side with a spirit duplicating ink of the formulas given in the following examples:

Example I

| Ingredient | Weight Percentage |
|---|---|
| Wetting agent | 0.5 |
| Cetyl alcohol | 13.0 |
| Carnauba wax | 37.0 |
| Spermacetti wax | 7.0 |
| Crystal violet | 35.0 |
| Attapulgus clay | 6.5 |

Example I-continued

| Ingredient | Weight Percentage |
|---|---|
| Silanox | 1.0 |
| | 100.0% |

Example II

| Ingredients | Weight Percentage |
|---|---|
| Wetting agent | 0.5 |
| Cetyl alcohol | 9.0 |
| Carnauba wax | 37.0 |
| Spermacetti wax | 7.0 |
| Crystal violet | 35.0 |
| Attapulgus clay | 10.0 |
| Silanox | 1.0 |
| | 100.0% |

Example III

| Ingredients | Weight Percentage |
|---|---|
| Wetting agent | 0.5 |
| Cetyl alcohol | 5.0 |
| Carnauba wax | 27.0 |
| Spermacetti wax | 7.0 |
| Crystal violet | 40.0 |
| Attapulgus clay | 9.0 |
| Silanox | 1.0 |
| | 100.0% |

The pre-printed masters of the above examples were tested for smear, storability, bleed, and duplicating capabilities and found to be acceptable in all respects, although, the color intensity after a large number of copies has been run was found not to be as great as in the prior art systems. However, as a trade-off for this slight loss of color, it was found that the halo effect and smear experienced was markedly reduced. Further, the pre-printed masters were formed into booklets of masters without the need for any interleaved protective tissue. It was observed that little or no transfer of the spirit duplicating ink occurred from one master to the adjacent master.

It should be apparent that the formulations above are only illustrative and ingredients and percentages may be varied within the general dictates given. Thus, candelilla wax has been used in place of the spermacetti wax with improved results in all three of the above formulations.

While the articles herein described constitute preferred embodiments of the invention, it is to be understood that the invention is not limited to these precise articles, and that changes may be made therein without departing from the scope of the invention which is defined in the appended claims.

What is claimed is:

1. A tissueless pre-printed spirit duplicating master having reverse printed on the backside thereof a non-bleed, hot melt, spirit duplicating ink comprising 5–25% cetyl alcohol, 31–48% wax and 35–45% crystal violet.

2. The tissueless pre-printed master of claim 1 wherein said non-bleed spirit duplicating ink comprises 31–48% wax, 35–45% crystal violet, 5–25% cetyl alcohol, 0–1% wetting agent, 0–10% dye solubilizer and 7–12% filler.

3. A tissueless pre-printed spirit duplicating master as set forth in claim 2 wherein said wax is a combination of carnauba wax and a soft was selected from the group consisting of spermacetti wax and candelilla wax.

4. A tissueless pre-printed spirit duplicating master as set forth in claim 3 wherein said filler material is a combination of attapulgite clay and fused silica.

5. A tissueless pre-printed spirit duplicating master as set forth in claim 4 wherein said non-bleed spirit duplicating ink consists essentially of 0.5% wetting agent, 13% cetyl alcohol, 37% carnabua wax, 7.0% soft wax selected from the group consisting of spermacetti wax and candelilla wax, 35% crystal violet, 6.5% attapulgite clay, and 1% fused silica.

6. The tissueless pre-printed master of claim 2 wherein said master has an image printed on the front side thereof, said reverse printed image being at least partially in registry with said image printed on the front side.

7. A tissueless booklet of pre-printed spirit duplicating masters comprising a plurality of pre-printed spirit duplicating masters each having reverse printed on at least one side thereof, a non-bleed hot melt, spirit duplicating ink comprising 5–25% cetyl alcohol, 31–48% wax and 35–45% crystal violet, said plurality of pre-printed masters being bound along one edge to form said booklet.

8. A tissueless booklet of pre-printed spirit duplicating masters comprising a plurality of pre-printed masters each having an image printed on the front side and having reverse printed on the back side a non-bleed, hot melt, spirit duplicating ink comprising 5–25% cetyl alcohol, 31–48% wax, 35–45% crystal violet, 0–1% wetting agent, 0–10% dye solubilizer, and 7–12% filler material, said reverse printed image being at least partially in registry with the image printed on the front side, said plurality of pre-printed masters being bound along one edge to form said booklet.

9. A tissueless booklet as set forth in claim 8 wherein said wax is a combination of carnauba wax and a soft wax selected from the group consisting of spermacetti wax and candelilla wax.

10. A tissueless booklet as set forth in claim 9 wherein said filler material is a combination of attapulgite clay and fused silica.

11. A tissueless booklet as set forth in claim 10 wherein said non-bleed spirit duplicating ink consists essentially of 0.5% wetting agent, 13% cetyl alcohol, 37% carnauba wax, 7.0% soft wax selected from the group consisting of spermacetti wax and candelilla wax, 35% crystal violet, 6.5% attapulgite clay, and 1% fused silica.

* * * * *